United States Patent [19]

Chikuma

[11] Patent Number: 5,063,556
[45] Date of Patent: Nov. 5, 1991

[54] OPTICAL INFORMATION RECORDING MEDIUM PROVIDING REFLECTED LIGHT AT TWO DIFFERENT WAVELENGTHS, RECORDING APPARATUS UTILIZING THE SAME

[75] Inventor: Kiyofumi Chikuma, Saitama, Japan

[73] Assignee: Pioneer Electronic Corporation, Tokyo, Japan

[21] Appl. No.: 489,636

[22] Filed: Mar. 7, 1990

Related U.S. Application Data

[62] Division of Ser. No. 327,884, Mar. 23, 1989, Pat. No. 4,927,681.

[30] Foreign Application Priority Data

Aug. 12, 1988 [JP] Japan ............................. 63-202542

[51] Int. Cl.$^5$ ............................. G11B 7/00; G11B 7/24
[52] U.S. Cl. ..................................... 369/112; 369/100; 369/109; 369/275.1
[58] Field of Search ............ 369/112, 105, 110, 44.23, 369/275.1, 44.35, 100, 275.3, 275.4, 94; 250/201.5; 350/286, 601; 428/64, 65; 365/127, 119

[56] References Cited

U.S. PATENT DOCUMENTS

| | | | |
|---|---|---|---|
| 4,709,139 | 11/1987 | Nakamura et al. | 250/201.5 |
| 4,724,533 | 2/1988 | Ohara et al. | 369/112 |
| 4,888,752 | 12/1989 | Arai | 369/44.23 |
| 4,888,756 | 12/1989 | Shikicki et al. | 369/44.35 |
| 4,985,885 | 1/1991 | Ohta et al. | 369/275.1 |

Primary Examiner—Roy N. Envall, Jr.
Assistant Examiner—Than Tran
Attorney, Agent, or Firm—Sughrue, Mion, Zinn, Macpeak & Seas

[57] ABSTRACT

Recording medium having islands of light-emitting material in regions formed between a transparent substrate, and a reflective layer disposed on one principal surface thereof. The islands of light-emitting material are sensitive to illuminating light incident thereupon, and in response thereto, emit light having a different wavelength than said illuminating light. Reproducing apparatus separates an overall reflected light from the recording medium into first reflected light corresponding to a reflected scanning light, and second reflected light corresponding to emitted light from the light emitting material.

5 Claims, 2 Drawing Sheets

OPTICAL INFORMATION RECORDING MEDIUM PROVIDING REFLECTED LIGHT AT TWO DIFFERENT WAVELENGTHS, RECORDING APPARATUS UTILIZING THE SAME

This is a divisional of application Ser. No. 07/327,884 filed Mar. 23, 1989, now U.S. Pat. No. 4,927,681.

TECHNICAL FIELD

The present invention relates to an optical information recording medium and a recording apparatus utilizing the same.

BACKGROUND OF THE INVENTION

Optical information recording media, typically optical disks such as compact disks and video disks, are designed to record information utilizing the presence or absence of small pits (i.e., arranged in an array along circular or spiral "tracks"), wherein reproduction of recorded information is performed by detecting said presence or absence of small pits using an optical pickup and producing an electrical signal corresponding thereto. In some optical disks, recorded information is detected by directing a light beam along a track and monitoring a difference in the reflectance of a small region on account of pigments or phase change, and producing the electrical signal according to this difference.

An information recording/reproducing system using the optical disks described above have such frequency characteristics that the amount of information (stored via the presence or absence of pits or regions) that can be detected is limited by a spatial frequency which is 2 $NA/\lambda$ at maximum, where NA is a numerical aperture of a lens in a reproducing optical system, and $\lambda$ is a wavelength of information detecting light. Therefore, any efforts toward increasing a recording density of information on optical disks (e.g., by such techniques as mastering) have been limited by a fact that the only information that can be detected is that within the spatial frequency 2 $NA/\lambda$.

SUMMARY OF THE INVENTION

An object, therefore, of the present invention is to provide an optical information recording medium that allows information to be recorded and reproduced at an increased density.

Another object of the present invention is to provide a reproducing apparatus utilizing such as a recording medium.

The first object of the present invention can be attained by an optical information recording medium which has islands of light-emitting material in regions formed between a transparent substrate, and a reflective layer disposed on one principal surface thereof. The islands of light-emitting material are sensitive to illuminating light incident upon the other principal surface of said substrate, and responsive thereto, emit light having a different wavelength than said illuminating light. This medium is adapted such that a recorded information surface comprises record information in accordance with an array of said islands of light-emitting material (e.g., arranged along circular or spiral "tracks").

The second object of the present invention can be attained by a playing apparatus using the above-described optical information recording medium. In such an apparatus, said recording medium is illuminated with a small spot of scanning light directed to scan the recorded information surface, and reflected light from the recording medium is separated into first reflected light corresponding to reflected scanning light, and second reflected light corresponding to reflected or emitted light from the light-emitting material. A focus error signal is generated on a basis of a reception output of the first reflected light, while recorded information and a tracking error signal are read and generated on a basis of a reception output of the second reflected light.

DETAILED DESCRIPTION OF THE PREFERRED EMBODIMENTS

Embodiments of the present invention are described hereinafter with reference to the accompanying drawings.

Figure 1:
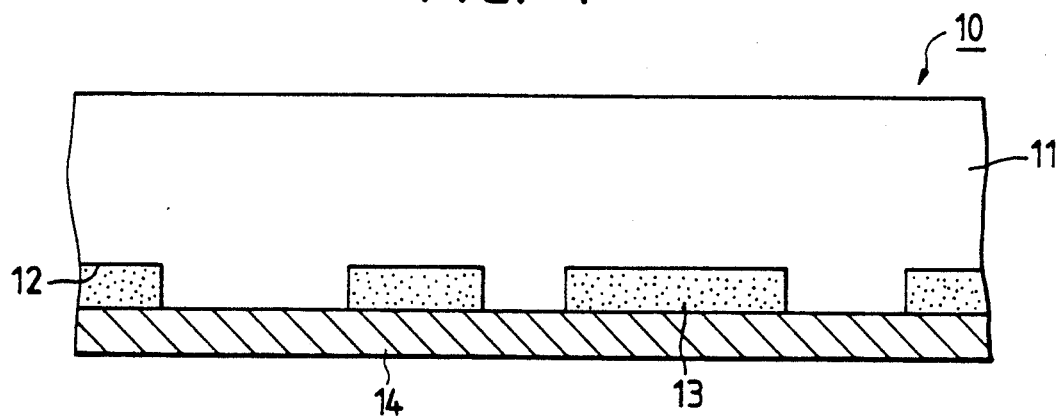
FIG. 1 is a cross-sectional view of an optical information recording medium according to an embodiment of a first aspect of the present invention.

FIG. 1 is a cross section of an optical information recording medium according to an embodiment of a first aspect of the present invention. The optical information recording medium 10 has a transparent substrate 11 that is made of a resin such an acrylic or polycarbonate resin, and which has rows of small recesses 12 formed in an array in a spiral or concentric pattern in one principal surface thereof. The recesses 12 in the substrate 11 are individually filled with a light-emitting filler material to provide islands of light-emitting material or region 13. The filler material is sensitive to illuminating light incident on the other principal surface of the substrate 11 and, responsive thereto, emits light having a different wavelength than the illuminating light. Suitable light-emitting materials are photoluminescent materials, fluoresent dyes, phosphors, etc. An outermost side of light-emitting region 13 is coated with a reflective layer 14, which reflects both the illuminating light coming from the other principal surface of the substrate and the light emitted from the light-emitting region 13.

The substrate 11 of the recording medium 10 having the structure described above may easily be replicated from a stamper which is prepared in any known "mastering" step of the conventional process of optical disk fabrication. Therefore, information is recorded in accordance with an array of light-emitting islands of light-emitting material 13 formed within the recesses 12.

Figure 2:
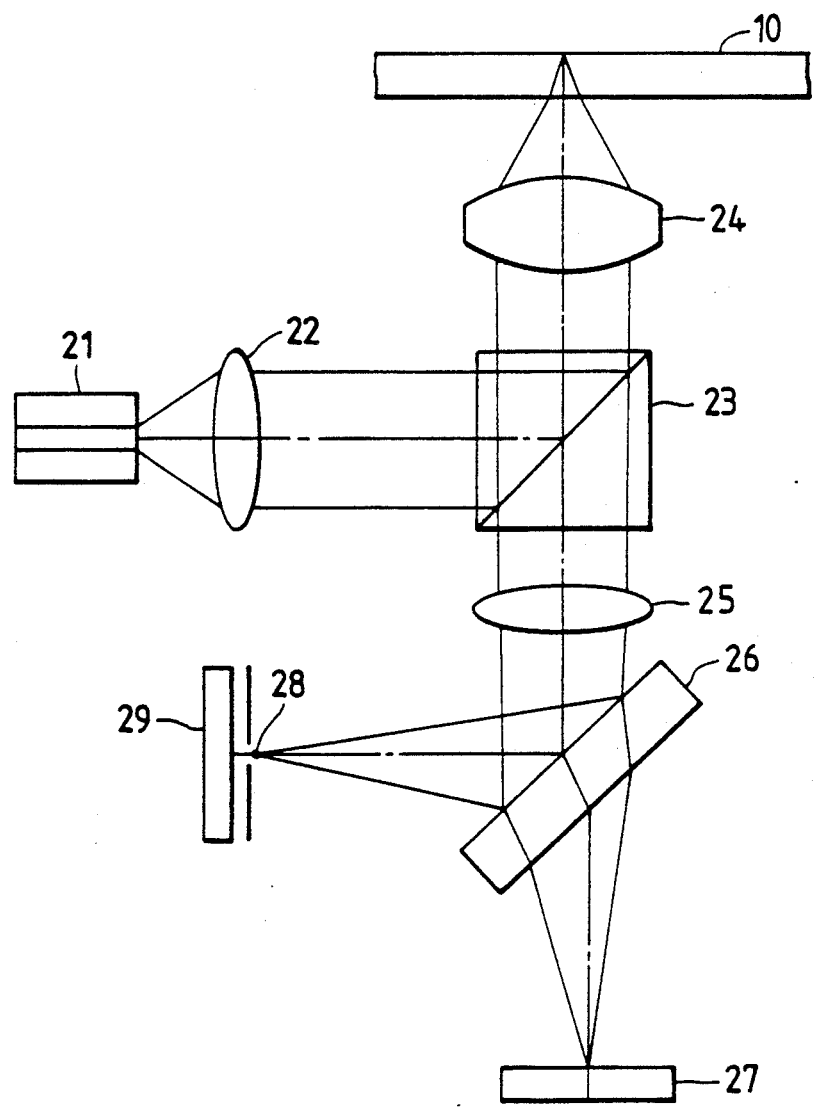
FIG. 2 is a schematic diagram showing a reproducing apparatus according to an embodiment of a second aspect of the present invention.

The construction of a playing apparatus utilizing the above-disclosed recording medium 10 is described hereinafter with reference to FIG. 2 illustrating an embodiment of this apparatus. Incoherent diffusive light issuing from a light source 21 such as a semiconductor laser is converted to parallel rays by passage through a collimator lens 22. After being reflected from a beam splitter 23, the parallel rays of light are converged with an objective lens 24 to form a small spot of scanning light which illuminates or is directed to scan the information recording surface of the recording medium 10. Upon illumination, the light-emitting material, such as a photoluminescent material in the islands of light-emitting region 13 of the recording medium 10, will emit light having a different wavelength than the illumination or scanning light. The emitted light is reflected from the reflective layer 14, which also reflects the illumination light incident on areas where no light-emitting region is formed.

The reflected light from the recording medium 10 passes successively through the objective lens 24 and the beam splitter 23 and is converged by a condenser lens 25 for launching into a dichroic mirror 26. The dichroic mirror 26 is a kind of interference filter having wavelength characteristics which transmit a first reflected light corresponding to a reflected scanning light which was originally emitted from the light source 21, while reflecting a second reflected light corresponding to a reflected or emitted light from the light-emitting material or region 13, thereby separating an overall reflected light into two kinds of reflected light having different wavelengths.

The light passing through the dichroic mirror 26 is given astigmatism and converted to an electrical signal by a "four-division" or four-quadrant photodetector 27. The light reflected from the dichroic mirror 26 passes through a pinhole 28 and is converted to an electrical signal by a photodetector 29.

From the four outputs of the four-division photodetector 27, a focus error signal can be generated by a well-known "astigmatism method" which determines a difference between the two output sums of diagonal elements. By driving the objective lens 24 in an optical axial direction on a basis of the generated focus error signal, the focal plane of the objective lens 24 can be brought into alignment with a recorded information surface of the recording medium 10.

In contrast, the output from the photodetector 29 is directly picked up as an read information signal. At the same time, a tracking error signal is generated from said output from the photodetector 29 by a well known "wobbling method" which determines a differential output from the photodetector 29 for two phases (90° and 270°) by swinging a small spot of light slightly from right to left and vice versa. This tracking error signal is used to control a position of a small spot of light in a direction perpendicular to the row of islands of light-emitting material 13, thereby allowing the small spot of illumination or scanning light to be always maintained on a row of islands of light-emitting material 13.

Figure 3:
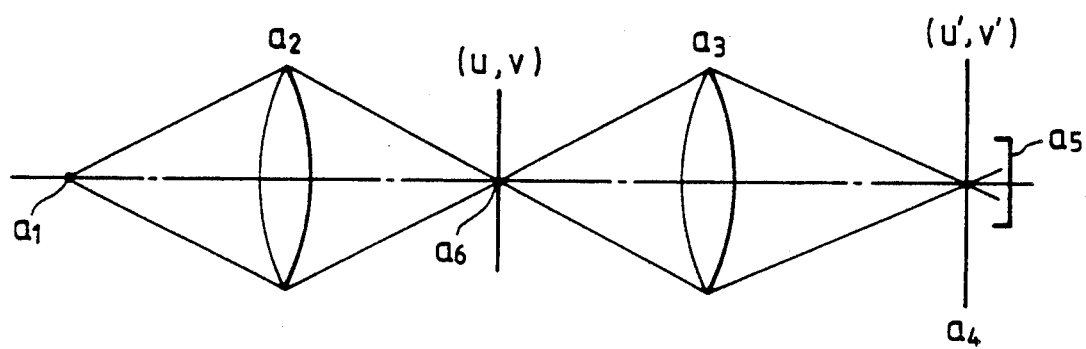
FIG. 3 is a diagram illustrating a concept of the frequency characteristics of a recording/reproducing system using the recording medium of the present invention.

The frequency characteristics of a recording/reproducing system utilizing the optical information recording medium 10 of the present invention are described below in reference to FIG. 3 illustrating the operating theory of the system.

Light issuing from a light source $a_1$ passes through a lens $a_2$ to be converged at a small light-emitting region $a_6$ on an information recording surface. If the intensity I of the spot of converged rays from the light source is written as Io(u,v), this intensity can be expressed by:

$$Io(u,v) = \left| \int\int_\Omega f_1(x,y) \exp\left[ i2\pi \frac{NA}{\lambda} \cdot (ux + vy) \right] dxdy \right|^2$$

where $\lambda$ is a wavelength of outgoing light, NA is a numerical aperture of lens $a_2$, $f_1(x,y)$ is a pupil function of lens $a_2$, and $\Omega$ is the pupil plane. For sake of simplicity, assume here that the recording medium is so constructed as to cause cyclic changes in an intensity of light emission. In other words, assume that when using Io(u,v) (which is the intensity of the spot produced by the light from the light source), the intensity $I_R(u,v)$ of light emission from a given area $a_6(u,v)$ on the recording medium is expressed by:

$$I_R(u,v) = A\left\{ B + Io(u,v) \cos\left[ \frac{2\pi(u - st)}{p} \right] \right\}$$

where A and B are constants of reflection intensity, p is a period of the cyclic change in emission intensity, s is a speed at which the spot of scanning light moves on the recording medium, and t is the time. When the spot of light radiated from the light-emitting area $a_6(u,v)$ is projected onto a given surface $a_4(u', v')$, the resulting image will have an intensity which can be expressed by:

$$I_s(u',v') = \int \left| \int\int f_2(x,y) \exp\left[ i2\pi \frac{NA_1}{\lambda_1} \cdot \{(u - u')x + (v - v')y\} \right] dxdy \right|^2 I_R(u,v) \, dudv$$

Where $NA_1$ is a numerical aperture of lens $a_3$, $\lambda_1$ is a wavelength of emitted light, and $f_2(x,y)$ is a pupil function of lens $a_3$. The output I of a photodetector $a_5$ can be expressed by:

$$I = \int I_s(u', v') \delta(u', v') du' dv'$$

where $\delta$ is Dirac's $\theta$ function. In calculating I, one will be able to see that a frequency band of an output signal from photodetector $a_5$ is limited by a numerical aperture of lens $a_3$. Computing the specific circumstances of this limitation shows that a temporal signal with a frequency of s/p is obtained when:

$$\frac{1}{p} \leq 2\frac{NA}{\lambda} + 2\frac{NA_1}{\lambda_1}$$

Therefore, information that can be read with the recording medium of the present invention should have a spatial frequency of $(2\,NA/\lambda) + (2\,NA_1/\lambda_1)$. Since this value is higher than that of the spatial frequency $(2\,NA/\lambda)$ limitation attributable to the inferior system described in the Background section, a conclusion is reached that the system of the present invention allows more information to be written in and read out of a given area of a recording medium.

It is to be noted that the concept of the present invention is applicable not only to optical disks such as compact disks and video disks but also to other recording media such as optical cards.

As should now be apparent from the foregoing discussion the optical information recording medium of the present invention has islands of light-emitting material or regions formed between a transparent substrate, and a reflective layer disposed on one principal surface thereof. The islands of light-emitting material are sensitive to illuminating light incident upon the other principal surface of said substrate, and responsive thereto, emit light having a different wavelength than said illuminating light. This medium is so adapted to record information in accordance with an array of said islands of light-emitting material. Because of this arrangement, a cutoff value of spatial frequency that limits information detection is doubled as compared to a described inferior system, thereby allowing information to be recorded and reproduced at an increased density.

The apparatus of the present invention for reproducing with this recording medium is designed such that it illuminates the medium with a small spot of scanning light that scans its recorded information surface, and separates an overall reflected light from the recording medium into types of reflected light having different wavelengths. A focus error signal can be generated on the basis of a first kind of reflected light, whereas a second kind of reflected light is used as a basis for reading the recorded information and generating a tracking error signal. This design has the advantage of simplifying a composition of the optical system for use in a reproducing apparatus.

What is claimed is:

1. An apparatus for reproducing optical information from a recording medium having a transparent substrate means, a reflective layer means for providing a first reflected light at a first wavelength based on a scanning light and island means disposed between the substrate means and the reflective layer means for providing a second reflected light at a wavelength different from that of the first reflected light, the island means being disposed in an array, said apparatus comprising:

illuminating optical system means for producing a small spot of said scanning light for scanning said array of said recording medium;
   separating optical system means for separating an overall reflected light from said recording medium into said first reflected light corresponding to reflected said scanning light, and said second reflected light corresponding to light emitted from a light-emitting material of said island means;
   first light-receiving means for receiving said first reflected light;
   second light-receiving means for receiving said second reflected light; wherein
   said reproducing apparatus generates a focus error signal on a basis of an output of said first light-receiving means, and generates a signal corresponding to recorded information on a basis of an output of said second light-receiving means and generates a tracking error signal in response thereto.

2. A reproducing apparatus according to claim 1, said reproducing apparatus further comprising:
   means for generating a focus error signal on a basis of an output of said first light-receiving means; and
   means for reading recorded information on a basis of an output of said second light-receiving means and generating a tracking error signal in response thereto.

3. A reproducing apparatus according to claim 1, wherein said substrate means is a resin and wherein said reproducing apparatus further comprises:
   first means for generating a focus error signal responsive to an output of said first light-receiving means;
   second means for providing a signal corresponding to recorded information on said recording medium responsive to an output of said second light-receiving means; and
   third means for generating a tracking error signal in response to said signal corresponding to recorded information.

4. A reproducing apparatus as claimed in claim 1, wherein said separating optical system means is an optical beam splitter means having separator means directing a passage of said first reflected light to said first light-receiving means, and directing a passage of said second reflected light to said second light-receiving means based on said wavelengths of said first and second reflected lights.

5. An apparatus for reproducing optical information from a recording medium having a transparent substrate means, a reflective layer means for providing a first reflected light at a first wavelength based on a scanning light and island means disposed between the substrate means and the reflective layer means for providing a second reflected light at a wavelength different from the second wavelength of the first reflected light, the island means including a plurality of reflecting regions disposed in an array, said apparatus comprising:
   optical system illuminating means producing a small spot of said scanning light for scanning said array of said recording medium;
   optical system separating means for separating an overall reflected light from said recording medium into said first reflected light corresponding to reflected said scanning light, and said second reflected light corresponding to light emitted from a said second reflected light corresponding to light emitted from a light-emitting material of said island means, said separating means being responsive to wavelengths of said first and second reflected lights;
   first light-receiving means for receiving said first reflected light;
   second light-receiving means for receiving said second reflected light;
   first means for generating a focus error signal responsive to an output of said first light-receiving means;
   second means for providing a signal corresponding to recorded information on said recording medium responsive to an output of said second light-receiving means; and
   third means for generating a tracking error signal responsive to said signal corresponding to recorded information.

* * * * *